United States Patent [19]

Greefkes

[11] 3,831,092

[45] Aug. 20, 1974

[54] TRANSMITTER FOR THE TRANSMISSION OF SIGNALS BY PULSE CODE MODULATION

[75] Inventor: Johannes Anton Greefkes, Emmasingel, Eindhoven, Netherlands

[73] Assignee: U.S. Philips Corporation, New York, N.Y.

[22] Filed: Mar. 7, 1073

[21] Appl. No.: 338,766

Related U.S. Application Data

[63] Continuation of Ser. No. 133,587, April 13, 1971, abandoned.

[52] U.S. Cl. .................... 325/38 B, 325/42, 178/68

[51] Int. Cl. ............................................ H04b 1/00

[58] Field of Search ........... 325/38 R, 38 B, 42, 44, 325/141; 332/11 D; 178/68

[56] References Cited

UNITED STATES PATENTS

| | | | |
|---|---|---|---|
| 3,555,423 | 1/1971 | Weston | 325/38 B |
| 3,729,678 | 4/1973 | Glasbergen et al. | 325/38 B |
| 3,746,990 | 7/1973 | LeDiberder et al. | 325/38 B |

*Primary Examiner*—Robert L. Griffin
*Assistant Examiner*—Aristotelis M. Psitos
*Attorney, Agent, or Firm*—Frank R. Trifari; Simon L. Cohen

[57] ABSTRACT

A delta modulation transmitter which in addition to the comparison circuit includes a second circuit having a dynamic control voltage generator fed by the output pulses from the pulse code modulator and including in its output circuit an integrating network for producing a dynamic control voltage which controls a pulse modulator in the comparison circuit, and a control voltage balancing circuit. For a considerable further reduction of the quantization noise and the influence of tolerance in the elements, so that complete integration in a semiconductor body is made possible, the transmitter is furthermore provided with a third feedback circuit whose input is connected to the output of the pulse code modulator and which includes an integrating network whose cut-off frequency is lower than the cut-off frequency of the integrating network incorporated in the comparison circuit so as to integrate the output pulses from the pulse code modulator, while the output of the third circuit is coupled to said comparison circuit in a point located between the output of the pulse modulator and the input of the pulse code modulator.

7 Claims, 2 Drawing Figures

PATENTED AUG 20 1974 3,831,092

Figure 1:
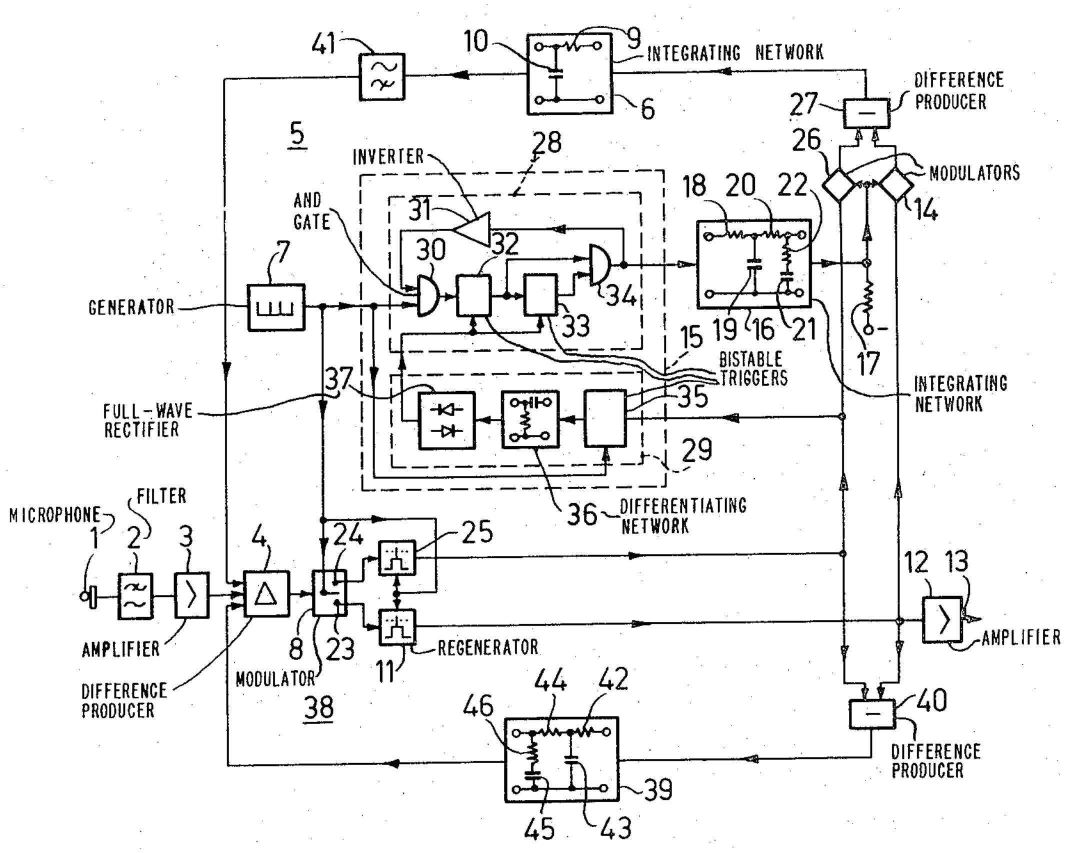

INVENTOR.

JOHANNES A. GREEFKES

BY

Frank R. Trifari

AGENT

PATENTED AUG 20 1974 3,831,092

SHEET 2 OF 4

INVENTOR.
JOHANNES A. GREEFKES
BY
AGENT

PATENTED AUG 20 1974

3,831,092

SHEET 3 OF 4

INVENTOR.

JOHANNES A. GREEFKES

BY

Frank R. Trifari

AGENT

PATENTED AUG 20 1974

3,831,092

SHEET 4 OF 4

*INVENTOR.*

JOHANNES A. GREEFKES

*BY*

[signature]

AGENT

TRANSMITTER FOR THE TRANSMISSION OF SIGNALS BY PULSE CODE MODULATION

This is a continuation, of application Ser. No. 133,587, filed Apr. 13, 1971 now abandoned.

The invention relates to a transmitter for the transmission of signals by pulse code modulation, the transmitter being provided with a pulse code modulator connected to a pulse generator, the output pulses of the pulse code modulator being transmitted to a co-operating receiver and also being applied to a comparison circuit including a cascade circuit of an integrating network and a difference producer. The cascade circuit generates a difference signal for controlling the pulse code modulator. The transmitter is also provided with a dynamic control circuit comprising a pulse modulator connected to the input of the comparison circuit and a dynamic control voltage generator fed by the output pulses from the pulse code modulator The dynamic control voltage generator includes an integrating network in its output circuit so as to generate a dynamic control voltage for controlling the pulse modulator, and control voltage balancing means for suppressing the varying direct current component introduced into the comparison circuit by the dynamic control voltage generator.

An advantageous transmitter of the type described has already been proposed in copending U.S. Pat. application Ser. No. 164,479 filed July 20, 1971 in the name of the Applicant. In this transmitter the dynamic control voltage generator consists of a pulse pattern analyser fed by the output pulses from the pulse code modulator which analyser successively analyses the composition of the pulse patterns formed by the output pulses from the pulse code modulator within a fixed and a limited time interval of at least three successive pulses from the pulse generator and which, upon the occurrence of predetermined pulse patterns corresponding to a large modulation index within the fixed time interval, provides a pulsatory output voltage which is applied to an integrating network for generating the dynamic control voltage. As described in the patent application, a very high compression factor, of 40 dB is realized in the arrangement together with a structure suitable for employing digital techniques resulting in a considerable reduction of the quantization noise.

An object of the present invention is to provide a further improvement of a transmitter of the type described in which the reproducing quality is considerably enhanced in a surprisingly simple manner by means of an increase of the compression factor by more than 10 dB while the stability is also increased and an adverse influence of tolerances in the elements on the reproducibility is reduced to a great extent so that this arrangement is particularly suitable for construction in digital techniques and integration in a semiconductor body.

According to the invention, the transmitter is characterized in that it is provided with a third circuit whose input is connected to the output of the pulse code modulator, which third circuit is formed as a feedback circuit including an integrating network for integrating the output pulses from the pulse code modulator, which integrating network has a cut-off frequency which is lower than the cut-off frequency of the integrating network incorporated in the comparison circuit, the output of the third circuit being coupled to the comparison circuit in a point between the output of the pulse modulator and the input of the pulse code modulator.

In order that the invention may be readily carried into effect, some embodiments thereof will now be described in detail, by way of example, with reference to the accompanying diagrammatic drawings, in which:

FIG. 1 shows a transmitter for pulse code modulation according to the invention, while FIGS. 2–5 show time diagrams to explain the transmitter of FIG. 1.

The transmitter shown in a block diagram in FIG. 1 according to the invention is adapted for the transmission of continuous signals in the form of speech signals. Particularly, the speech signals derived from a microphone 1 are applied to a difference producer 4 through a speech filter 2 having a pass band of from 0.3 – 3.4 kHz and a low-frequency amplifier 3.

A comparison voltage for forming a difference voltage which controls a pulse code modulator 8 connected to a pulse generator 7 is set up at the difference producer 4 through a comparison circuit 5 which is provided with a local receiver incorporating an integrating network 6. The pulse generator 7 provides equidistant pulses having a repetition frequency which is one order of a magnitude higher than the highest speech frequency to be transmitted.

In the transmitter shown integrating network 6, which is composed of a series resistor 9 and a shunt capacitor 10, has a cut-off frequency of, for example, 200 Hz. The integrating network 6 may alternatively be formed in the manner described in British Pat. Specification 691,824.

Dependent on the polarity of the output voltage of difference producer 4, the pulses originating from pulse generator 7 either occur at the output of the pulse code modulator 8 or they are suppressed. Pulses passed by pulse code modulator 8 are, for example, indicated by 1 pulses while the suppressed pulses are indicated by 0 pulses.

A pulse regenerator 11 for suppressing the variations in amplitude, duration, shape or instant of occurrence of the pulses caused in pulse code modulator 8 is connected to the output of pulse code modulator 8 providing the 1 and 0 pulses. This regeneration is effected, for example, by substituting the applied pulses by pulses which are directly derived from the pulse generator 7. The regenerated pulses are transmitted after amplification in a power amplifier 12 through line 13 and, if desired, after modulation on a carrier to the co-operating receiver and are additionally applied to comparison circuit 5 comprising a local receiver including integrating network 6 at the output of which the previously mentioned comparison voltage is produced which is applied to difference producer 4.

The arrangement described continuously tends to render the difference voltage zero so that the comparison signal constitutes a quantized approximation of the input signal and, viewed in a time diagram, oscillates about the signal to be transmitted in a rhythm dependent on the pulse repetition frequency. Unlike other types of pulse code modulation, the code pulses in delta modulation do not characterize the instantaneous value of the signal to be transmitted, but basically the code pulses in delta modulation characterize at the instant of a pulse from pulse generator 7 solely the polarity of the difference between the relevant instantaneous value of the signal to be transmitted and the instantaneous value of the comparison signal at the instant of the immediately preceding pulse from pulse generator 7. Thus, the code pulses characterize a signal value which is primarily dependent on the slope of the signal to be transmitted.

In the described arrangement for delta modulation, quantization noise caused by amplitude quantization occurs upon reproduction of the signals to be transmitted, which noise, as is known, decreases as the frequency of the pulses from pulse generator 7 increases. Particularly in the arrangement described the power of the quantization noise is inversely proportional to the third power of the frequency of the pulses from pulse generator 7. quantization noise is substantially independent of the amplitude of the signal to be transmitted so that in case of a decreasing signal level the S/R-ratio between the signal and the quantization noise decreases proportionally to the signal level so that especially at low signal levels the reproducing quality is disturbingly influenced by the quantization noise.

In order to reduce the disturbing influence on the reproducing quality by the quantization noise, it has been known to control the amplitude of the pulses applied to integrating network 6 by means of a dynamic control circuit. For that purpose, a pulse modulator in the form of an amplitude modulator 14 is connected to the input of comparison circuit 5 and the amplitude of the pulses is controlled by means of a smoothed dynamic control voltage derived from a dynamic control voltage generator 15. Generator 15 is fed by the output pulses from pulse code modulator 8 and incorporates in its output circuit an integrating network 16 whose cut-off frequency is considerably lower than the cut-off frequency of integrating network 6 in comparison circuit 5. For example, the cut-off frequency of integrating network 16 is 100 Hz.

For a sensitive control it is advantageous that the amplitude of the pulses derived from amplitude modulator 14 is substantially proportional to the generated control voltage, which purpose is realized in a simple manner by also applying a constant reference voltage as a modulation voltage to amplitude modulator 14 through a resistor 17, the amplitude value of the voltage being adjusted in such a manner that in absence of a signal to be transmitted the amplitude of the pulses derived from amplitude modulator 14 is greatly reduced to approximately 1 percent. Preferably, dynamic control voltage generator 15 is constructed as a pulse pattern analyser in the manner already described in the aforementioned copending application Ser. No. 164,479, filed July 20, 1971 in which in a favourable embodiment integrating network 16 incorporated in the output circuit of generator 15 is built up as is illustrated in FIG. 1. Particularly, integrating network 16 includes a cascade arrangement of a first section consisting of a series resistor 18 and a shunt capacitor 19 having a cut-off frequency of, for example, 50 Hz and a second section having a higher cut-off frequency of, for example, 100 Hz and consisting of a series resistor 20 and a shunt impedance constituted by a series arrangement of a capacitor 21 and a coupling resistor 22. Coupling resistor 22 causes a portion of the output voltage of the first section 18, 19 to occur between the output terminals together with the integration voltage occurring at capacitor 21.

As has been explained in the above-mentioned copending patent application Ser. No. 164,479, the measures described will provide a particularly effective dynamic control in the transmission of continuously varying signals by means of delta modulation, but for obtaining optimum results it is important to suppress the varying direct current component introduced into the output pulses from amplitude modulator 14 as a result of the modulation by the dynamic control voltage. This suppression is effected by means of a control voltage balancing arrangement incorporated in comparison circuit 5. Since a transmitter for delta modulation has the property to compensate for a signal introduced into the delta modulation loop, the direct current component introduced into the output pulses from amplitude modulator 14 by the dynamic control voltage will simultaneously cause the average pulse density of the code pulses from the pulse code modulator 8 to vary, which inter alia results in the modulation range being reduced.

In the embodiment shown, pulse code modulator 8 also forms part of the control voltage balancing arrangement in that a pulse code modulator 8 is used which comprises a change-of-state contact for generating two complementary pulse series occurring at outputs 23, 24, respectively. For example, if a pulse series 1110010 occurs at output 23 of pulse code modulator 8, a pulse series 0001101 occurs at output 24 of pulse code modulator 8, which latter pulse series is handled in the delta modulation loop in exactly the same manner as the pulse series at output 23. Particularly, these pulses at output 24 are applied through a pulse regenerator 25 controlled by pulse generator 7 to an amplitude modulator 26 which is controlled by the control voltage of pulse pattern analyser 15. Thus, at the output of amplitude modulator 26, there occurs a complementary pulse series having the same amplitude as the pulse series at the output of amplitude modulator 14, the both pulse series at the outputs of amplitude modulators 14, 26 being applied to integrating network 6 through a difference producer 27 for suppressing their direct current component. Instead of the pulse series consisting of pulses which are present and absent, for example, the pulse series 01110010, a pulse series having pulses of opposite polarity of the form −1+1+1+1−1−1+1−1 is applied to integrating network 6 by means of the control voltage balancing arrangement so that the direct current component of the pulse series varying with the dynamic control voltage is balanced, thus obtaining satisfactory results as already described hereinbefore.

As already previously described, a pulse pattern analyser is used as a dynamic control voltage generator 15 in copending patent application Ser. No. 164,479, which pulse pattern analyser in a advantageous embodiment is arranged for analysing pulse patterns within a time interval of four successive pulses from pulse generator 7. The pulse pattern analyser 15 provides an output pulse only for a configuration of four successive 1 pulses or 0 pulses at one of the outputs 23, 24 of pulse code modulator 8. Of the $2^4$ different pulse configurations at the outputs 23, 24 of pulse code modulator 8 possible within this time interval, pulse pattern analyser 15 thus only provides an output pulse for two pulse configurations, namely when four consecutive 1 pulses or four consecutive 0 pulses occur.

This pulse pattern analyser 15 which only provides an output pulse when four consecutive 1 pulses or four consecutive 0 pulses occur, is very simple in structure. Particularly, this pulse pattern analyser 15 is formed by a pulse counter 28 connected to pulse generator 7, which counter counts up to four pulses, and a reset circuit 29 controlled by the pulses at output 24 of pulse code modulator 8, which reset circuit resets pulse counter 28 to its initial position in case of a perturbation of the successive occurrence of 1 pulses or 0 pulses at the relevant outputs of pulse code modulator 8.

Pulse counter 28 is formed by a cascade arrangement of AND gate 30 to which the pulses from pulse generator 7 and also the output voltage of pulse counter 28 are applied through an inverter 31, a first bistable trigger 32 formed as a 2-to-1 divider, a second bistable trigger 33 formed as a 2-to-1 divider and AND gate 34 to which the input and output voltages of bistable trigger 33 are applied, while the output voltage from AND gate 34 is applied to integrating network 16 for dynamic control on the one hand and to AND gate 30 through inverter 31 on the other hand.

The reset circuit 29 consists of a bistable trigger 35 controlled by pulses from pulse generator 7 and pulses at output 24 of pulse code modulator 8, which bistable trigger is in its one stable state when 1 pulses occur at output 24 and in its other stable state when 0 pulses occur, and a differentiating network 36 and a full-wave rectifier 37. With each perturbation of the successive occurrence of 1 pulses or 0 pulses at output 24 of pulse code modulator 8, bistable trigger 35 changes over and a pulse of alternately positive and negative polarity is obtained by differentiation in differentiating network 36, which pulses after rectification in full-wave rectifier 37 into pulses of one polarity are applied as reset pulses to the two bistable triggers 32, 33.

Figure 2:
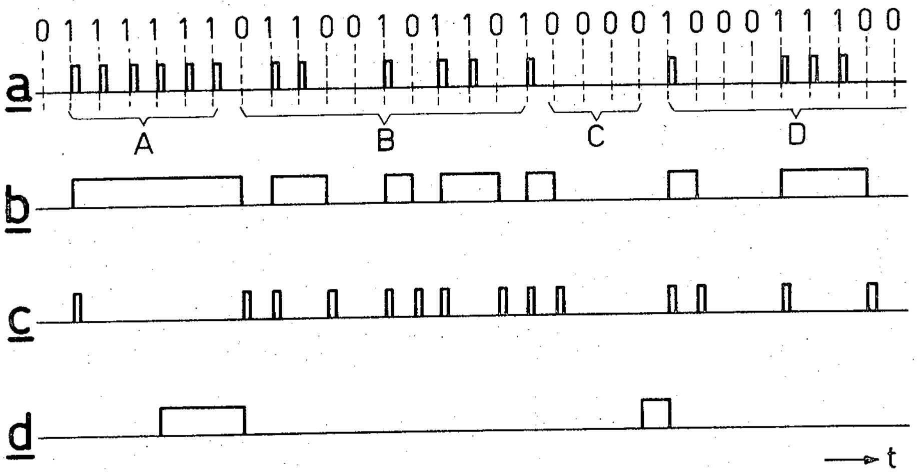
Figure 3:
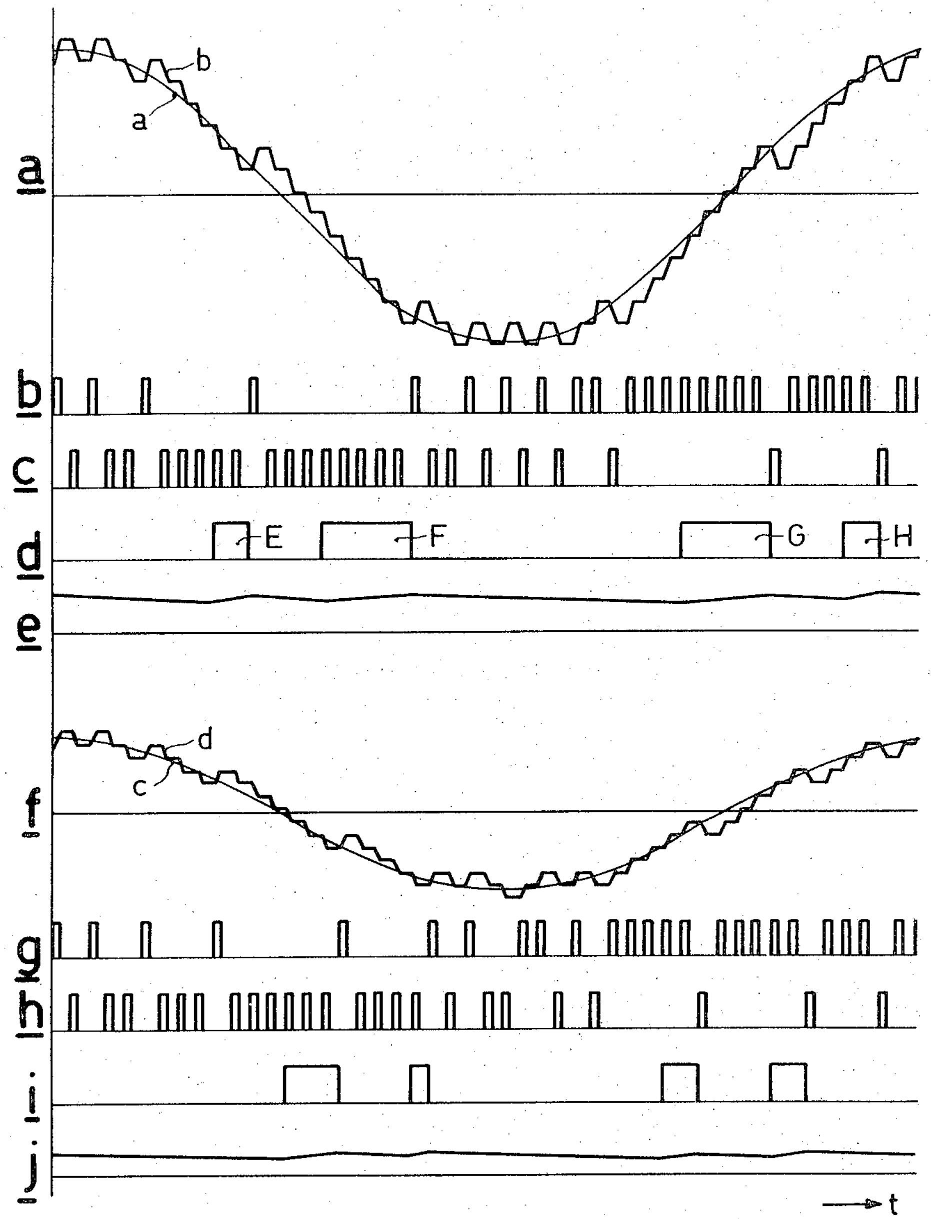

FIG. 2 shows a few time diagrams to explain the operation of pulse pattern analyser 15 described,. A pulse series composed of 1 pulses and 0 pulses originating from output 24 of pulse code modulator 8 is shown at *a* in FIG. 2. If bistable trigger 35 of reset circuit 29 has an output voltage of 1 or 0 in its two stable states when a 1 pulse or a 0 pulse occurs, a voltage of the form shown at *b* in FIG. 2 will occur at the output of bistable trigger 35 as a result of the pulse series illustrated in FIG. 2*a*. The pulse series of positive pulses shown in FIG. 2*c* is obtained by differentiation of the pulse series shown in FIG. 2*b* in differentiating network 36 and by subsequent rectification in the rectifier 37. Thus, with each perturbation of the successive occurrence of a series of 1 pulses or 0 pulses of the pulse series shown in FIG. 2*a*, a reset pulse is produced which resets pulse counter 28 to its initial position.

The operation of pulse counter 28 upon the occurrence of the pulse series according to FIG. 2*a* will be described starting from the pulse pattern denoted by A in FIG. 2*a* which pattern consists of six consecutive 1 pulses and is applied to pulse pattern analyser 15. As may be apparent from the pulse series in FIG. 2*c*, reset circuit 29 provides a reset pulse for pulse counter 28 upon the first pulse of pulse pattern A so that pulse counter 28 is reset to its initial position or position "1", that is to say, the position in which bistable triggers 32, 33 as well as AND gate 34 have an output voltage 0, while a voltage 1 is applied to the input of AND gate 30 through inverter 31.

At the second pulse of pulse pattern A the corresponding pulse from pulse generator 7 is passed by AND gate 30, which pulse causes bistable trigger 32 to change over and position "2" of pulse counter 28 occurs, the output voltages of bistable triggers 32, 33 AND gate 34 and inverter 31 being 1, 0, 0, 1, respectively.

At the third pulse of pulse pattern A the relevant pulse from pulse generator 7 is passed by AND gate 30, which pulse causes bistable trigger 32 to change over to its original stable state so that also bistable trigger 33 is set in its other stable state and position "3" of pulse counter 28 occurs, the output voltages of bistable triggers 32, 33, AND gate 24 and inverter 31 being 0, 1, 0, 1, respectively.

At the fourth pulse of pulse pattern A in which position "4" or final position of pulse counter 28 occurs, the relevant pulse from pulse generator 7 passes AND gate 30, which pulse again causes bistable trigger 32 to change over to its other stable state so that AND gate 34 produces an output voltage 1, since the input and output voltages of bistable trigger 33 are both 1. In this final position of pulse counter 28, the output voltages of bistable triggers 32, 33, AND gate 34 and of inverter 31 are 1, 1, 1, 0, respectively; AND gate 30 is now blocked for pulses from pulse generator 7, since a voltage 0 is applied to the input of AND gate 30 through inverter 31.

At the fifth pulse of pulse pattern A, that is to say, at the second pulse pattern of four consecutive 1 pulses that pulse pattern A comprises, starting at its second pulse and stopping at its fifth pulse, AND gate 30 does not pass a pulse and pulse counter 28 remains in its final position in which AND gate 34 continues to apply an output voltage to integrating network 16, as does AND gate 34 for the sixth pulse of pulse pattern A, until pulse counter 28 is reset to its initial position by means of reset circuit 29 due to the occurrence of the first pulse in the subsequent pulse pattern B which first pulse is formed by a 0 pulse.

Upon the occurrence of pulse pattern A composed of six consecutive 1 pulses and thus comprising three pulse patterns each having four consecutive 1 pulses, namely one reckoning from the first pulse, one reckoning from the second pulse and one reckoning from the third pulse in pulse pattern A, pulse pattern analyser 15 provides a pulse having a duration which is equal to three times the period of the pulses from pulse generator 7.

Only when at least four equal pulses consecutively occur at output 24 of pulse code modulator 8, pulse counter 28 can reach its final position and supply an output pulse, since otherwise pulse counter 28 is reset to its initial position by a reset pulse from reset circuit 29 already before reaching its final position. Thus, in pulse pattern C consisting of four consecutive 0 pulses, pulse pattern analyser 15 will produce an output pulse in the manner already described with reference to pulse pattern A, while four consecutive 1 pulses or 0 pulses nowhere occur in the pulse patterns B and D and accordingly no output voltage will be provided by pulse pattern analyser 15.

In this manner the pulses shown in FIG. 2*d* will be produced by pulse pattern analyser 15 as a result of the pulse series in FIG. 2*a*, the dynamic control voltage being obtained by integration in integrating network 16, which control voltage is applied to amplitude modulators 14, 26 for the purpose of amplitude control of the pulses applied to integrating network 6. A very effective dynamic control is achieved with the circuit described, as will now be described in greater detail with reference to the time diagrams shown in FIG. 3.

The curve a in FIG. 3*a* shows a speech signal having a frequency of 800 Hz which is transmitted by the transmitter for delta modulation of FIG. 1 at a pulse frequency of 40 KHz of pulse generator 7, that is to say, fifty 1 or 0 pulses are transmitted within one period of this speech frequency. The curve b in FIG. 3*a* shows the steplike varying comparison signal occurring at the output of integrating network 6, the amplitude of one step being given by the amplitude of the pulses derived from amplitude modulators 14, 26, the amplitudes of the latter pulses being controlled through integrating network 16 by the output voltage of pulse pattern analyser 15, while FIGS. 3*b* and *c* show the pulses of pulse code modulator 8 occurring at the outputs 23, 24, respectively.

In the successive fixed time intervals of 100 $\mu s$ of four consecutive pulses from pulse generator 7 corresponding to approximately 1/10 period of the signal to be transmitted according to curve a in FIG. 3*a*, pulse pattern analyser 15 analyses the transmitted pulse series in the manner as already analysed hereinbefore. Whenever four consecutive 1 pulses or four consecutive 0 pulses occur in the pulse series of FIGS. 3*b* and 3*c*, respectively, pulse pattern analyser 15 will produce an output pulse (compare FIG. 3*d*) having a duration which is equal to one period of the pulses from pulse generator 7, the dynamic control voltage being produced by means of integration of these output pulses in integrating network 16 for the purpose of amplitude control of the pulses applied to integrating network 6. The dynamic control voltage is illustrated on a larger scale in FIG. 3*e*.

When the amplitude of the signal to be transmitted is changed, the amplitude of the pulses applied to integrating network 6 will be adapted to this change in amplitude of the signal to be transmitted by means of the dynamic control voltage produced as is illustrated in the time diagrams of FIGS. 3*f*, *g*, *h*, *i*, *j*. The curve c in FIG. 3*f* shows the speech signal corresponding to the curve a in FIG. 3*a*, which signal is now, however, decreased in amplitude. In FIG. 3*f* the curve d shows the associated comparison signal while the time diagrams in FIGS. 3*g*, *h*, *i* and *j* successively illustrate the pulses at the outputs 23, 24 of pulse code modulator 8, the output pulses from pulse pattern analyser 15 and the dynamic control voltage produced.

It is found that in this manner a particularly effective dynamic control is realized for delta modulation. As has been extensively described in the copending application Ser. No. 164,479, it is found that the steps in the comparison signal and thus the amplitude of the pulses applied to integrating network 6 are adjusted by the control voltage at exactly the value at which the transmitter for delta modulation is just fully loaded, which fact in delta modulation implies a maximum S/R-ratio between signal and quantization noise.

The Applicant has found that, although in the transmitter for delta modulation a considerable improvement of the reproducing quality is realized, under certain circumstances this reproducing quality may be detrimentally influenced by weak disturbing signals in the form of noise, interference tones etc. Particularly, it has been found that during the speech intervals and at very low signal levels of, for example, 35 to 40 dB below the nominal level, there was no improvement as had been expected but even a deterioration of the reproducing quality. As extensive experiments to find the cause of this unexpected phenomenon have shown, this deterioration is to be ascribed to the co-operation of leakage currents in elements of the equipment described and low-frequency noise located in the frequency band of from 0 Hz to several Hz (known as 1/f-noise) having certain properties of the delta-modulation loop and of the desired type of dynamic control circuit.

Figure 4:
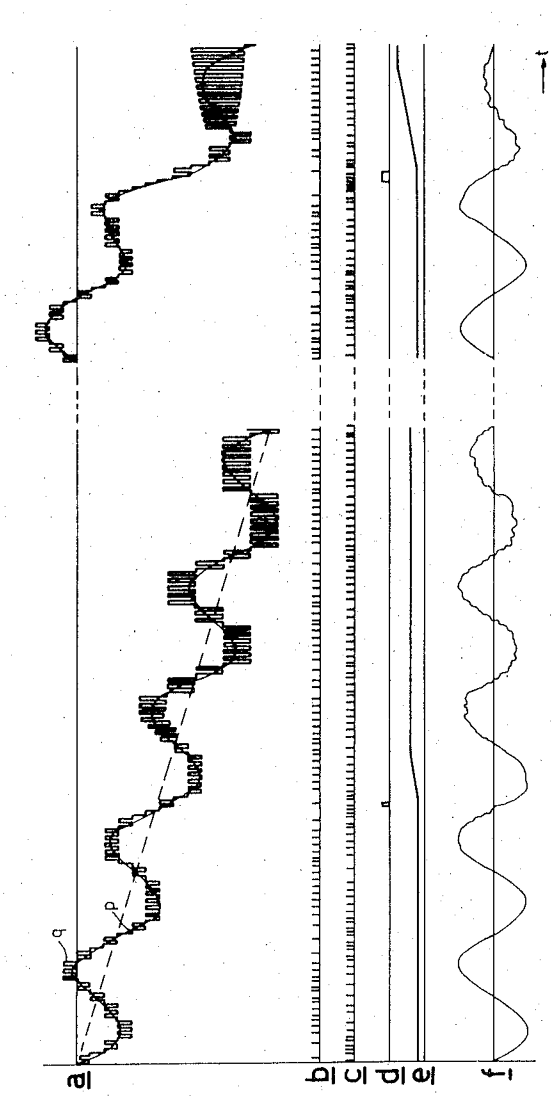
Figure 5:
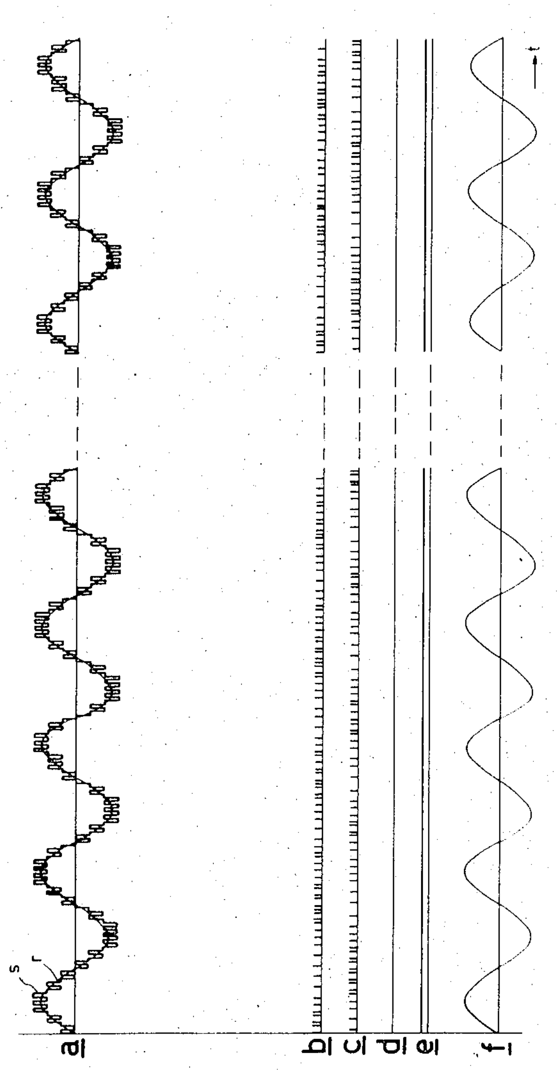

To explain the above-mentioned phenomenon, FIG. 4 shows some time diagrams which are interrupted by a broken line so as to limit the length. To this end FIG. 4*a* shows the signal over a time which is large as compare with the diagrams of FIG. 3, which signal is formed by the sum of the speech signal of 800 Hz having an attenuation of, for example, 40 dB relative to the nominal signal level, corresponding to an attenuation factor of 100, while the leakage currents in the elements of the equipment as well as the low-frequency noise in difference producer 4 are illustrated on a larger amplitude scale. The curve *p* shows the speech signal as such while the curve *q* shows the steplike varying comparison signal occurring at the output of integrating network 6, the amplitude of one step in accordance with the attenuation factor of 100 being brought to approximately 1/100 of its value at the nominal level because in the relevant low signal level the pulses originating from pulse code modulator 8 are also attenuated by a factor of approximately 100 in the amplitude modulators 14, 26.

Unlike the situation for a speech signal of a high signal level, the speech signal is now in the order of magnitude of the voltage caused by leakage currents and low-frequency noise in difference producer 4 (compare *a* in FIG. 4) which results in the successive generation of 1 or 0 pulses in the delta modulation loop, because as a result of the tendency of the delta modulation loop to render the difference voltage zero, the direct voltage introduced by leakage currents and low-frequency noise will cause the mean pulse density to vary. The pulse series produced at the outputs 23, 24 of pulse code modulator 8 are shown in FIGS. 4*b* and *c*, respectively, pulse pattern analyser 15 providing an output pulse whenever four consecutive 1 pulses or four consecutive 0 pulses occur (compare *d* in FIG. 4) which output pulse is applied through integrating network 16 as a dynamic control voltage to amplitude modulators 14, 26 (compare *e* in FIG. 4). As compared with the value of the dynamic control direct voltage which is substantially nil at the present low signal level the value of the variation in the output voltage of integrating network 16 (compare *e* in FIG. 4) is relatively large when a pulse from pulse pattern analyser 15 suddenly occurs so that the amplitude of the pulses applied to integrating network 16 is abruptly increased within a time interval given by the abruptly constant of integrating network 16 and hence the magnitude of the step in the comparison signal *q* in FIG. 4*a* is also increased which results in a strong non-linear effect.

In spite of the fact that the phenomena described above occur in the very low-frequency range outside the speech band in case of a low signal level or in case of speech intervals, interference components having a noiselike spectrum distribution are found to penetrate this speech band due to the strong non-linear character, as is illustrated in FIG. 4*f* where the reproduced speech signal is shown at the output of a speech filter having a pass-band of 300–3,400 Hz.

After the occurring unfavourable influence on quality was found and after its cause was detected the reproducing quality in the relevant transmitter was improved to a considerable extent in that in addition to comparison circuit 5 and dynamic control circuit 15, 16 the transmitter is provided with a third circuit 38 whose input is connected to the output of pulse code modulator 8, which third circuit 38 is formed as a feedback circuit including an integrating network 39 having a cut-off frequency which is lower than the cut-off frequency of integrating network 6 incorporated in comparison circuit 5, and integrating the output pulses from pulse code modulator 8, while the output of the third circuit 38 is coupled to said comparison circuit 5 in a point located between the output of pulse modulators 14, 26 and the input of pulse code modulator 8. In constructing integrating network 39 it has been ensured that the speech components at the output of integrating network 39 are considerably attenuated as compared with the speech components at the output of integrating network 6 in comparison circuit 5, even at the lowest signal levels. Particularly, it is found to be advantageous for the practical equipment to choose the cut-off frequency of integrating network 39 to be markedly lower than that of integrating network 16 in the output circuit of pulse pattern analyser 15, for example, at least a factor of 10 lower.

In the embodiment shown in FIG. 1 the third circuit 38 of the delta modulation transmitter is connected by means of a difference producer 40 and through pulse regenerators 11, 25 to the outputs 23, 24 of pulse code modulator 8, while the output of difference producer 40 is connected to integrating network 39 whose output is connected to the input of difference producer 4. Due to difference producing action on the complementary pulse series at outputs 23, 24 of pulse code modulator 8, a pulse series composed of positive and negative pulses is produced at the output of difference producer 40, which pulse series is applied after integration in integrating network 39 to the input of difference producer 4.

To explain the operation of the described device, the starting condition will be a high or a nominal signal level. The voltage then introduced into difference producer 4 by leakage currents or low-frequency noise is negligibly small as compared with the speech signal and the pulses applied to integrating network 6 also have a large amplitude. In the manner already described with reference to the time diagrams of FIG. 3, the signal applied to difference producer 4 is approximated by the signal derived from integrating network 6 in relatively large steps while realizing, as has been described with reference to these diagrams, an eminent reproducing quality. In this condition the third circuit 38 does not exert any influence yet.

When the level of the speech signal decreases for example by a factor of 100 relative to the nominal signal level, the circumstances change completely. In fact, in this case the voltage introduced into difference producer 4 by leakage currents or low-frequency noise is in the order of magnitude of the speech signal and the amplitude of the output pulses derived from amplitude modulators 14, 26 is only 1/100 of the code pulses derived from pulse code modulator 8. Accordingly a comparison signal having small steps is produced at the output of integrating network 6. In this case, however, substantially no variation in the density of the generated pulse series will occur due to the action of the third circuit 38, which variation as already extensively described with reference to FIG. 4 is caused by the fact that the voltage introduced into difference producer 4 by leakage currents or low-frequency noise is followed by the comparison signal having small steps. In fact, if a varying pulse density were introduced by this voltage originating from leakage currents or low-frequency noise, this pulse series having a varying pulse density will likewise occur at the input of the third circuit 38, but now having a pulse amplitude which is a factor of 100 larger than the amplitude of one step in the comparison signal derived from integrating network 6. As a result, difference production in difference producer 40 and integration in integrating network 39 will generate a voltage which effectively compensates the voltage originating from leakage currents or low-frequency noise in difference producer 4.

The third circuit 38 counteracts the occurrence of varying pulse densities which would otherwise cause pulse pattern analyser 15 to be excited and hence would give rise to interference signals in the speech band due to the highly non-linear effects already extensively described with reference to FIG. 4. The comparison signal having small steps follows the low-level speech signal at the output of integrating network 6 so that an eminent approximation of the speech signal is obtained, which approximation is not adversely influenced by the presence of the third circuit 38, because as already mentioned, no speech components can penetrate into difference producer 4 through third circuit 38 due to the low cut-off frequency of integrating network 39.

Thus, comparison circuit 5 and dynamic control circuit 15, 16 connected thereto ensures a reproduction of the speech signals having an excellent reproducing quality and third circuit 38 obviates the adverse influence of voltages originating from leakage currents or low-frequency noise on the reproducing quality at low signal levels, while, in addition, it appears that undesired reaction phenomena do not occur. Both effects result in an improvement of the reproducing quality for low signal levels as will be further explained with reference to the time diagrams of FIG. 5.

The curve r in FIG. 5*a* shows the input signal applied to difference producer 4, which in the arrangement according to the invention almost exclusively consists of the speech signal because third circuit 38 compensates the voltage originating from leakage currents and low-frequency noise to a great extent, as already extensively explained hereinbefore; curve s shows the comparison signal.

In FIGS. 5*b* and *c*, the complementary pulse series at outputs 23, 24 of pulse code modulator 8 are shown, in which pulse series for the relevant low signal level the occurrence of four consecutive 1 pulses or four consecutive 0 pulses is obviated by using the measures according to the invention. Accordingly, as illustrated in FIGS. 5*d* and *e*, pulse pattern analyser 15 will not produce output pulses and hence abrupt voltage variations in the output voltage of integrating network 16 will not occur, which abrupt variations would otherwise give rise to interference signals in the band of the reproduced speech signals due to highly nonlinear effects.

Finally, FIG. 5*f* shows the reproduced signal derived from a speech filter, the reproducing quality of which signal is improved as compared with the reproduced signals in FIG. 4f due to the absence of the non-linear effects.

Thus, not only a considerably improvement of the reproducing quality is realized for low-signal levels, but the use of the third circuit 38 also permits an increase of the compression factor by 10 to 15 dB so that the reproducing quality for low-signal levels can even be increased, since the increase of the compression factor by 10 to 15 dB involves a reduction of the quantization noise by the same amount. In addition to the advantage mentioned, the transmitter has the advantage that the stability is increased and an unfavourable influence of tolerances in the elements of the equipment on the reproducibility is greatly reduced, so that this transmitter is particularly suitable for construction in digital techniques and integration in a semiconductor body.

The improvement in stability may be utilized in an appropriate manner for achieving a direct voltage separation of integrating network 6 and difference producer 4 in comparison circuit 5 by means of a high-pass filter 41, providing the practical advantage that a direct voltage match of integrating network 6 and difference producer 4 is not necessary. In the absence of the third circuit 38 this latter measure involves the risk of instabilities because then the delta modulation loop does no longer provide for any direct voltage stabilisation.

In this respect it is to be noted that it is advantageous to form the integrating network in third circuit 38 in the manner shown in detail at block 39 in FIG. 1. More particularly, integrating network 39 includes a cascade arrangement of a first section consisting of a series resistor 42 and a shunt capacitor 43, and a second section consisting of a series resistor 44 and a shunt impedance constituted by a series arrangement of a capacitor 45 and a coupling resistor 46. The cut-off frequencies of the two sections 42, 43 and 44, 45, 46 are then chosen to be at least a factor of 10 lower than the cut-off frequencies of the corresponding sections of integrating network 16 connected to pulse pattern analyzer 15, for example, these cut-off frequencies are 5 and 10 Hz, respectively.

Finally, it is to be noted that other embodiments are possible within the scope of the present invention. Thus, for example, the pulse pattern analyzer 15 and the control voltage balancing circuit may be structured in one of the several ways described in the copending application Ser. No. 164,479. Likewise, it is possible to structure pulse code modulator 8 in such a manner that a pulse series consisting of positive and negative pulses can directly be derived therefrom, which pulse series can then be applied directly to integrating network 39 in third circuit 38.

What is claimed is:

1. A transmitter system comprising a pulse generator of periodic timing pulses, a pulse code modulator coupled to said pulse generator for providing two-valued output pulses in synchronism with said timing pulses, a first means for generating a first negative feedback signal for said pulse code modulator, said first means comprising a dynamic control generator coupled to the output of said pulse code modulator for providing dynamic control pulses in accordance with said two-valued output pulses, a first integrating network for integrating said dynamic control pulses to provide a dynamic control signal, and pulse modulating means coupled to the output of said pulse code modulator for modulating said two-valued output pulses in accordance with said dynamic control signal and producing modulated output pulses of either the one or the other polarity according to the value of said two-valued output pulses, a comparison system for providing a signal for controlling said pulse code modulator, said comparison system comprising a difference producer having at least a first input, a second input and an output, means to couple an analog input signal to said transmitter to said first difference producer input, and coupling means including a second integrating network, said coupling means coupling the output of said pulse modulating means to said second difference producer input and the output of said difference producer to said pulse code modulator, a second means for generating a second negative feedback signal for said pulse code modulator, said second means comprising a third integrating network, means to couple the output of said pulse code modulator to the second means, and means to couple the output of the second means to said comparison means, said second integrating network having a cut-off frequency of the same order of magnitude as the lowest frequency in said analog input signal, said third integrating network having a cut-off frequency which is at least one order of magnitude lower than the cut-off frequency of said second integrating network so that, at said lowest analog input signal frequency, the second feedback signal has substantially no influence on the pulse code modulator when said dynamic control signal has its lowest value, the influence of said second feedback signal on the pulse code modulator at substantially zero frequency being at least one order of magnitude greater than that of the first feedback signal when said dynamic control signal has its lowest value.

2. A transmitter as claimed in claim 1, wherein said pulse code modulator has two outputs providing a first two-valued output signal of on and off pulses and a second two-valued output signal of on and off pulses that is complementary to said first output signal, said means coupling the output of said pulse code modulator to said second means comprising combination means for combining said first and second output signals for providing input pulses for said third integrating network having either the one or the other polarity according to the occurence of an on pulse in said first or second output signal.

3. A transmitter as claimed in claim 1, wherein the cut-off frequency of the third integrating network is lower than the cut-off frequency of the first integrating network.

4. A transmitter as claimed in claim 3, wherein the cut-off frequency of the third integrating network is at least a factor of ten lower than the cut-off frequency of the first integrating network.

5. A transmitter as claimed in claim 1, wherein the third integrating network is formed by a cascade of two sections, one section comprises a series resistor and a shunt capacitor, the other section comprises a series resistor and a shunt impedance, said shunt impedance including a series arrangement of a resistor and a capacitor.

6. A transmitter as claimed in claim 1, wherein the comparison system further includes a high pass filter between the second integrating network and in the difference producer therein.

7. A transmitter as claimed in claim 1, wherein the output means of the second means is coupled to the input means of the difference producer of the comparison system.

* * * * *

PO-1050
(5/69)

UNITED STATES PATENT OFFICE
CERTIFICATE OF CORRECTION

Patent No. 3,831,092 Dated August 20, 1974

Inventor(s) JOHANNES ANTON GREEFKES

It is certified that error appears in the above-identified patent and that said Letters Patent are hereby corrected as shown below:

ON THE TITLE PAGE

"[22] Filed: Mar. 7, 1073" should read

--[22] Filed: Mar. 7, 1973--;

Insert where appropriate:

-- FOREIGN APPLICATION PRIORITY DATA

April 29, 1970 Netherlands................7006248--;

IN THE SPECIFICATION

Col. 3, line 14, before "quantization" insert --The--;

Col. 8, line 7, "desired" should be --described--;

Signed and sealed this 18th day of March 1975.

(SEAL)
Attest:

RUTH C. MASON
Attesting Officer

C. MARSHALL DANN
Commissioner of Patents
and Trademarks